(12) United States Patent
Andrews

(10) Patent No.: US 11,356,758 B2
(45) Date of Patent: Jun. 7, 2022

(54) LOUDSPEAKER RIGGING APPARATUS

(71) Applicant: Funktion One Research, Dorking (GB)

(72) Inventor: Anthony John Andrews, Dorking (GB)

(73) Assignee: Funktion One Research, Surrey (GB)

( * ) Notice: Subject to any disclaimer, the term of this patent is extended or adjusted under 35 U.S.C. 154(b) by 0 days.

(21) Appl. No.: 17/170,077

(22) Filed: Feb. 8, 2021

(65) Prior Publication Data

US 2021/0250669 A1  Aug. 12, 2021

(30) Foreign Application Priority Data

Feb. 10, 2020  (GB) ..................................... 2001793

(51) Int. Cl.
| | | |
|---|---|---|
| *H04R 1/40* | (2006.01) | |
| *H04R 1/02* | (2006.01) | |
| *F16M 11/18* | (2006.01) | |
| *F16M 11/42* | (2006.01) | |

(52) U.S. Cl.
CPC .............. *H04R 1/023* (2013.01); *F16M 11/18* (2013.01); *F16M 11/42* (2013.01); *H04R 1/403* (2013.01); *H04R 2201/025* (2013.01)

(58) Field of Classification Search
CPC ........ H04R 1/026; H04R 1/403; H04R 27/00; H04R 2201/025; H04R 1/02; H04R 2201/401; H04R 1/025
See application file for complete search history.

(56) References Cited

U.S. PATENT DOCUMENTS

| | | | |
|---|---|---|---|
| 5,758,852 A | 6/1998 | Martin | |
| 7,997,552 B2 | 8/2011 | Engebretson et al. | |
| 2007/0000719 A1 | 1/2007 | Bothe | |
| 2009/0022354 A1 | 1/2009 | Parker | |
| 2012/0093347 A1 | 4/2012 | Adamson et al. | |
| 2013/0126457 A1 | 5/2013 | Sturm, Jr. et al. | |
| 2018/0109859 A1* | 4/2018 | De Haan | H04R 1/026 |

FOREIGN PATENT DOCUMENTS

| | | |
|---|---|---|
| CN | 104902379 A | 9/2015 |
| GB | 2202710 A | 9/1988 |
| WO | WO 2006/031245 A2 | 3/2006 |

OTHER PUBLICATIONS

European Patent Office, Extended European Search Report, European Patent Application 21155968.7, dated Jul. 9, 2021, 10 pages.
Intellectual Property Office of the United Kingdom, Search Report, Application No. GB2001793.5, dated Jun. 24, 2020, four pages.

* cited by examiner

*Primary Examiner* — Kile O Blair
(74) *Attorney, Agent, or Firm* — Fenwick & West LLP

(57) ABSTRACT

A loudspeaker rigging apparatus (100) for suspending a plurality of loudspeakers from temporary or permanent structure. The loudspeaker rigging apparatus (100) comprises a beam (102) configured to be secured to an uppermost speaker in an array of speakers (106) and a trolley (121) coupled to the beam (102) and moveable along at least part of a length of the beam (102). The trolley (121) comprises a rigging point (110) configured for connection to the rigging or scaffold, and the beam (102) may be angularly displaced with respect to a horizontal plane when the rigging point (110) is connected to the rigging or scaffold.

19 Claims, 4 Drawing Sheets

LOUDSPEAKER RIGGING APPARATUS

CROSS REFERENCE TO RELATED APPLICATIONS

This application claims priority from United Kingdom Application No. 2001793.5, filed on Feb. 10, 2020, which is incorporated by reference in its entirety.

TECHNICAL FIELD

The invention relates to methods and apparatus for rigging loudspeaker systems. In particular, embodiments may relate to rigging loudspeaker systems for concerts, nightclubs and music festivals having large audiences. The invention may relate to rigging loudspeaker systems that comprise multiple loudspeakers suspended in an array from a temporary structure, such as a scaffold, or a permanent structure.

BACKGROUND

Loudspeakers for concerts, nightclubs and music festivals may be rigged in vertically aligned arrays. In such arrays, the loudspeakers may be suspended from a temporary or permanent structure, with each loudspeaker being suspended from the loudspeaker above. For the remainder of this document, the term scaffold is used for ease, although this may be interpreted as a temporary or permanent structure. It will be appreciated that the loudspeakers are typically housed in a speaker enclosure that is more regular in shape and therefore more easily formed into an array. The term loudspeaker or speaker may be used herein to encompass a speaker enclosure containing a loudspeaker In arrays of loudspeakers, the loudspeakers typically are arranged as one or more columns and are required to be angled relative to each other so as to provide the desired vertical coverage of sound. In certain arrangements, the speakers will be angled to produce an arced or curved array, which may form a "J" shape.

Typically, each column comprises a top loudspeaker which is attached to a lifting frame. The other loudspeakers of the column are suspended from each other by links and by pivotal arrangements, typically at the front and rear providing a range of inter-loudspeaker angles. In order to deploy some systems of this type, a lifting beam is attached to a frame, which in turn is attached to connecting plates of a first loudspeaker enclosure, which may be connected to either side of the loudspeaker enclosure.

The frame is lifted and further speakers added to the column. After each loudspeaker has been attached, the lifting frame is raised to allow room for the next level of loudspeakers to be mounted.

When the array is suspended from the scaffold off the ground, the loudspeakers are rotated or tilted with respect to each other in a vertical plane. In order to produce the curved array, a lever hoist is attached to the rear of a lower speaker of the array. The lever hoist is tensioned rearwards and the lower speaker is drawn upwards and to the rear, rotating one or more of the speakers with respect to each other and forming the curve.

The act of curving the array, for example as described above, moves the centre of gravity of the overall array, and consequently the angle of inclination or declination of the array. Further, the differently aligned load may affect an angle at which the speaker array is directed towards the audience, which may compromise audio performance.

SUMMARY

Exemplary methods and apparatus are able to control the angular displacement of the array whilst under load, i.e. whilst the loudspeaker array is suspended. According to the invention in an aspect, there is provided a loudspeaker rigging apparatus for suspending a plurality of loudspeakers from temporary or permanent structure, the loudspeaker rigging apparatus comprising: a beam configured to be secured to an uppermost speaker in an array of speakers; and a trolley coupled to the beam and moveable along at least part of a length of the beam, the trolley comprising a rigging point configured for connection to the rigging or scaffold, wherein the beam may be angularly displaced with respect to a horizontal plane when the rigging point is connected to the rigging or scaffold.

Movement of the rigging point alters the alignment of the rigging point with respect to the centre of gravity of the load exerted by the array.

Optionally, the rigging apparatus further comprises a trolley driver configured to provide a force for moving the trolley along the at least part of the length of the beam.

Optionally, the trolley driver comprises a threaded lead screw, and wherein the trolley comprises a threaded aperture through which the lead screw is received, such that rotation of the lead screw causes linear movement of the trolley.

Optionally, the trolley comprises at least one rotatable element in contact with a surface of the beam and configured to rotate on movement of the trolley.

Optionally, the at least one rotatable element comprises at least one wheel.

Optionally, the at least one rotatable element of the trolley is configured to contact a downward facing surface of the beam, such that at least a part of the load resulting from suspension of the array of loudspeakers is supported by the at least one rotatable element.

Optionally, an outer wall of the beam forms an internal cavity in which the trolley is received and that permits movement of the trolley along at least part of the length of the beam.

Optionally, an internal upper surface of the internal cavity forms the downward facing surface.

Optionally, the rigging apparatus further comprises an actuator configured to rotate the lead screw.

Optionally, the actuator comprises an electric motor.

Optionally, the rigging apparatus further comprises a motor controller for receiving operating instructions for the actuator from a remote device, and controlling the motor based on the received instructions.

Optionally, the rigging apparatus further comprises an inclinometer, configured to detect the angle of displacement of the beam with respect to the horizontal plane.

Optionally, the inclinometer comprises inertial sensors configured to determine angular displacement.

Optionally, the rigging apparatus further comprises a display configured to receive and display data indicative of the angle of displacement.

Optionally, the trolley is housed, at least partially, within the beam.

Optionally, the rigging point protrudes from an upper surface of the beam and is retained within a longitudinal slot formed in an outer wall of the beam.

Optionally, the rigging point comprises a single suspension point about which the beam may rotate.

According to the invention in an aspect, there is provided a rigged loudspeaker array comprising a loudspeaker rigging assembly according to any disclosed herein.

According to the invention in an aspect, there is provided a method for suspending a plurality of loudspeakers from a temporary or permanent structure, the method comprising: securing an uppermost speaker in an array of speakers to a beam; connecting a rigging point of a trolley to the temporary or permanent structure, wherein the trolley is connected to the beam and moveable along at least part of a length of the beam, and wherein the beam may be angularly displaced with respect to a horizontal plane when the rigging point is connected to the temporary or permanent structure; tensioning the array of speakers; and adjusting a position of the trolley along the length of the beam for achieving a desired angular displacement of the beam.

The method may include corresponding steps associated with any of the physical features of the rigging apparatus disclosed herein and, in particular, above.

DETAILED DESCRIPTION

Generally, disclosed herein are methods and apparatus for realigning a load of a suspended speaker array. This may be required after tensioning the lever hoist to place the suspended array into a "curve. In some exemplary arrangements, the speaker array may be suspended via a beam that is connected to a rigging or scaffold in such a way that the beam is able to rotate in a vertical plane or, put another way, to be angularly displaced with respect to a horizontal plane. When the speaker array is initially connected to the rigging, the beam may be level. After tensioning the speaker array, the centre of gravity of the array is shifted, which vertically rotates the beam, leading to misaligned and potentially unsafe loads. Methods and apparatus disclosed herein are arranged to realign the load of the speaker array.

It is noted that the term "tensioning" when referring to a suspended speaker array refers to drawing the array into the "J" shape. This typically requires tensioning of a chain of the lever hoist, as explained below. It is noted that the "tensioning" of the array may actually result in compression between the speakers at the rear and a tensioning of the speakers at the front, as they rotate in an articulated fashion to form the curve.

Figures 1A, 1B:
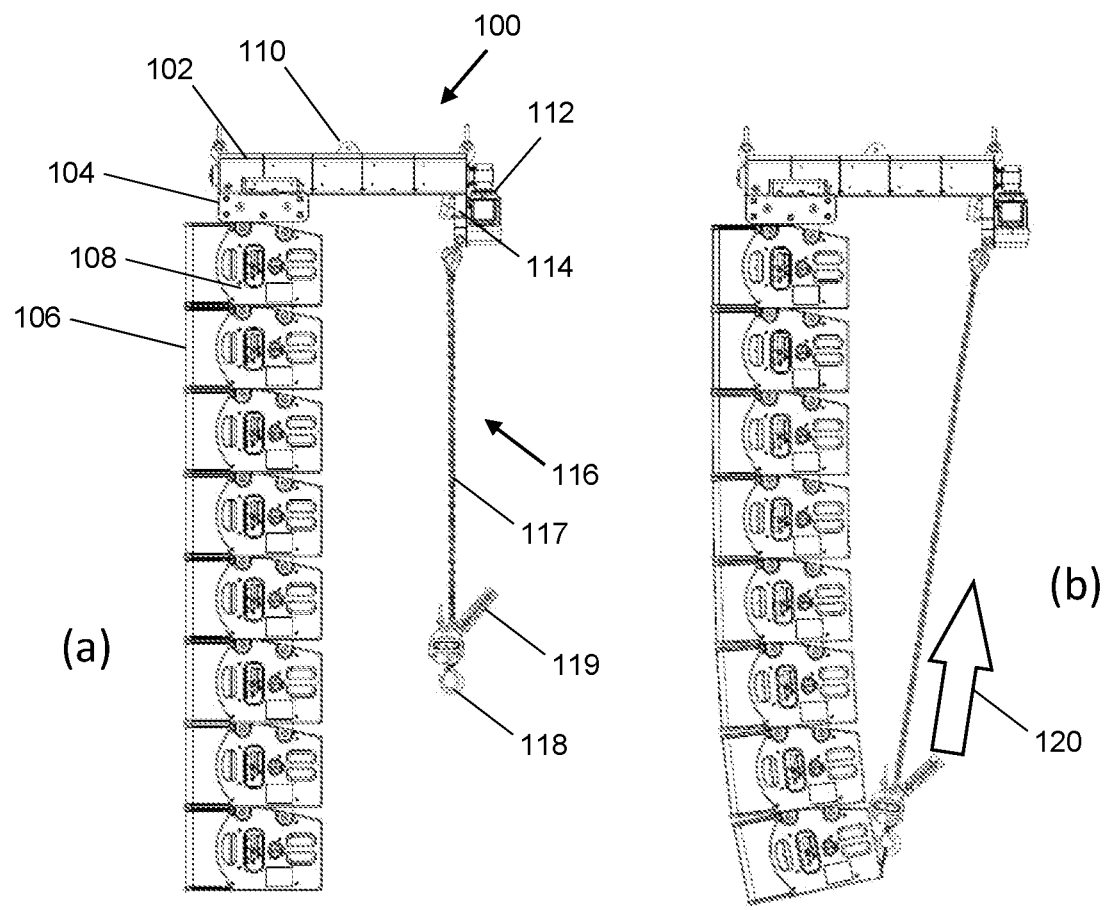
FIGS. 1a and 1b is an elevation of a loudspeaker rigging system and an array of suspended speakers being formed into a curve.

FIG. 1a shows a rigging apparatus 100 comprising a beam 102. The apparatus further comprises a frame 104 that is connected to the top speaker of an array 106. The frame 104 is connected to the beam 102. Specifically, in the example shown the frame 104 runs laterally along a width of the top speaker and is connected to a pair of connecting plates 108 on either side of the speaker (only one side shown). The connecting plates allow speakers to be connected to other speakers and/or to the frame. The frame 104 runs transverse to the beam 102 and is fixedly connected thereto. In exemplary arrangements, the frame 104 may be connected to the beam 102 by one or more pins that are removable, such as pip-pins.

The remaining speakers in the array 106 are each connected to and suspended from the speaker above. One or more of the connections may be configured to allow relative rotation of adjacent speakers.

The rigging apparatus further comprises a rigging point 110 for connection to the scaffold (not shown). The rigging point 110 forms part of a trolley, which is not shown in FIGS. 1a and 1b but is described in detail below. The rigging point 110 is configured to permit angular displacement of the beam with respect to a horizontal plane. In the example shown in FIGS. 1a and 1b, the rigging point comprises a single fixing, embodied as an aperture through which a shackle, pin, or other fixing may be passed when fixing the rigging apparatus 100 to the scaffold. As will be appreciated, the beam may therefore rotate in a vertical plane about the aperture in the rigging point.

The rigging apparatus 100 further comprises an actuator, which in the example shown is an electric motor 112, although other actuators may be used. The actuator is referred to as the electric motor 112 for the remainder of this description. The electric motor 112 is described in relation to the other features of the rigging apparatus 100 below.

The rigging apparatus further comprises an inclinometer 114. In the example shown, the inclinometer uses solid state inertial sensors to determine an angle of incline, but other types of inclinometer may be used. The lever hoist 116 is suspended from a rear portion of the beam 102. The lever hoist 116 comprises a chain 117, although other tensionable load bearing elements may be used, a hook 118 for connection to a lower (and optionally the lowest) speaker in the array 106 or an additional frame connected to the lower loudspeaker in the array, and a lever 119.

The connection of the hook 118 to the lower speaker of the array 106 is shown in FIG. 1b. The lever hoist chain 117 is tensioned in the direction of the arrow 120 by operation of the lever 119 in a ratchetting fashion to form the speaker array 106 into curve. In other arrangements, this tensioning may be provided by a winch that is controlled by the (or a further) electric motor 112.

Figure 2:
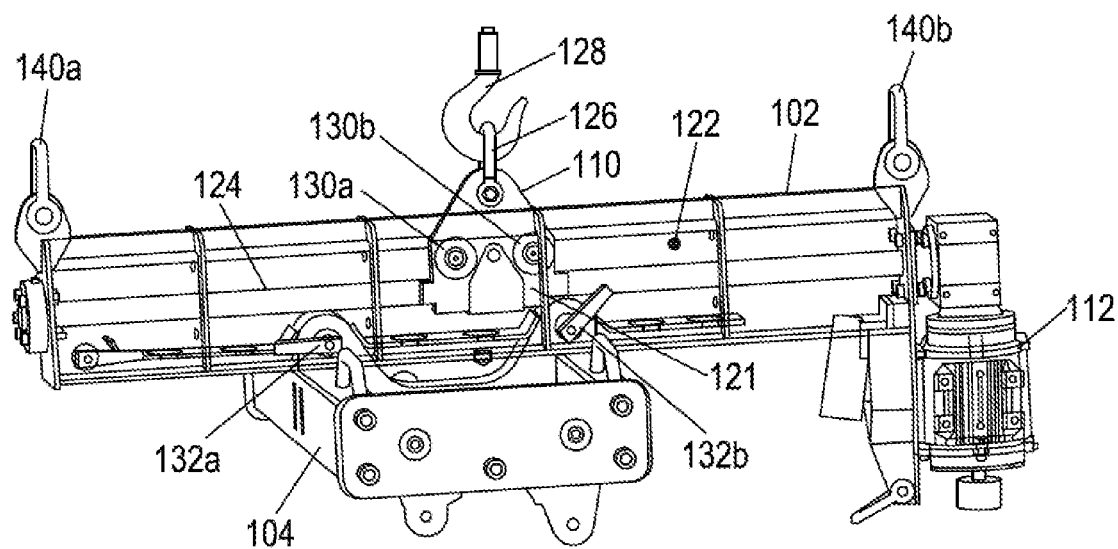
FIG. 2 is isometric view of a beam for forming part of a rigging apparatus.

FIG. 2 shows an isometric view of the beam 102. The beam 102 houses the trolley 121. An outer wall of the beam 102 forms an internal cavity 122 along at least part of the length of the beam 102. For the purposes of description, the outer wall of the beam 102 is not shown in FIG. 2 so that the trolley 121 and the internal cavity 122 are visible.

The internal cavity 122 allows movement of the trolley 121 along at least part of the length of the beam 102. The beam 102 comprises a trolley driver in the form of a lead screw 124, however other arrangements of trolley driver may be used. For example, the trolley 121 may comprise a motor or other means of propulsion arranged to move it along the beam 102. The lead screw 124 extends along a length of the beam 102 and in the example of FIG. 2, along the entire length of the beam 102. The lead screw 124 is threaded and passes through a correspondingly threaded aperture in the trolley 121. Therefore, rotation of the lead screw 124 translates into linear movement of the trolley 121 along the length of the lead screw 124.

The electric motor 112 is coupled to the lead screw 124 such that operation of the electric motor 112 rotates the lead screw 124, optionally via a gearbox. The electric motor 112 may be operated in a forward or reverse direction to control the position of the trolley 121 along the beam 102.

As discussed below, the rigging apparatus 100 further comprises a mechanism for transmitting data from a remote device to the electric motor 112. The data may be transmitted over a wired or wireless medium. The rigging apparatus may further comprise a computer processor configured to transform the received data into instructions for operation of the electric motor 112, and optionally other features of the rigging apparatus 100. The processor is therefore able to control operation of the electric motor 112 based on data received from the remote device.

The trolley 121 comprises the rigging point 110. In the example shown in FIG. 2, the rigging point 110 includes a shackle 126 bolted through the aperture. A hook 128 is passed through the shackle 126. The skilled person will be able to envisage many other means of suspending the beam 102. As mentioned above, the beam 102 may be rotated in a vertical plane or, put another way, angularly displaced with respect to a horizontal plane. In the example of FIG. 2, the beam 102 is able to rotate about the pin securing the shackle 126 to the rigging point 110.

The trolley also comprises one or more wheels 130a-130d (only wheels 130a and 130b can be seen in FIG. 2). The trolley 121 in the example of FIG. 2 comprises four wheels, two on either side, although only the two wheels 130a, 130b on one side of the trolley 121 are shown. However, it will be appreciated that other arrangements may use any friction reducing device such as a rotatable element, for example a sphere or roller, and that there may be any number of such rotatable elements.

The outer walls of the beam 102 form the internal cavity 122 and a longitudinal slot in an upper surface of the beam 102. The rigging point 110 protrudes through the longitudinal slot, which permits travel of the trolley 121 and the rigging point 110 along the length of the beam 102. The outer walls of the beam 102 also form internal upper surfaces either side of the longitudinal slot. The wheels 130a-130d are configured to contact the internal upper surfaces of the internal cavity 122 of the beam 102. The wheels 130a-130d are therefore able to bear at least part of the load caused by the suspension of the speaker array 106. In some examples, the wheels 130a, 130b bear a majority, and in some cases all, of the load.

The wheels 130a-130d reduce friction in the movement of the trolley 121 along the length of the beam 102. This in turn means that less torque is required to be provided by the electric motor 112 to rotate the lead screw 124, and that there is consistent and predictable movement of the trolley 121 for a given rotation of the electric motor 112 as stiction is removed.

As mentioned above, the frame 104 is fixedly connected to the beam 102 using pins 132a, 132b passed through apertures in the frame 104 and the beam 102 when they are aligned. The beam 102 may comprise a plurality of apertures configured to allow the frame 104 to be fixed to the beam 102 at a plurality of points along the length of the beam 102.

Figure 3:
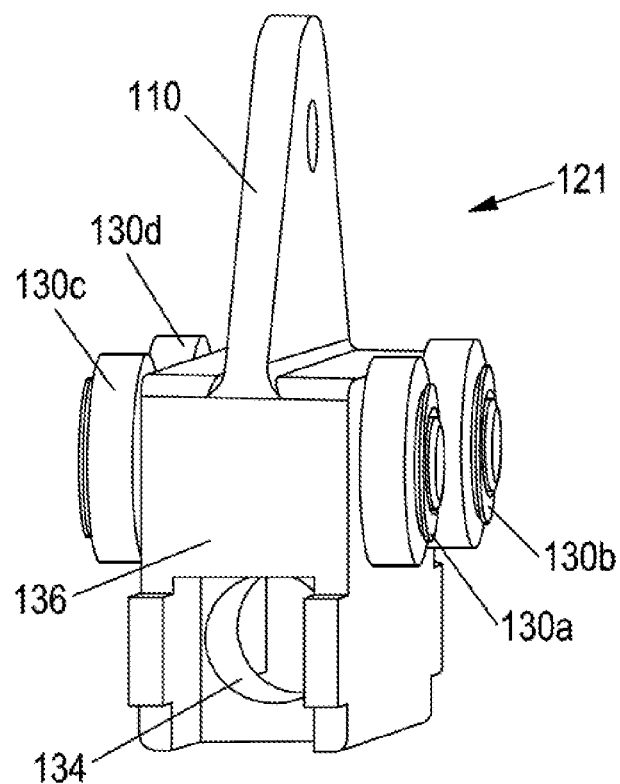
FIG. 3 is an isometric view of a trolley.

FIG. 3 shows an isometric view of the trolley 121. As described above, the trolley comprises a threaded aperture 134 configured to receive the lead screw 124. Further, FIG. 3 shows all four wheels 130a-130d. The wheels 130a-130d sit proud of an upper surface of a main body 136 of the trolley 121. Therefore, when the beam 102 is suspended from the rigging point 110 and the speaker array 106 is suspended from the beam 102, the load generated by the speaker array 106 pulls the internal upper surfaces of the beam 102 either side of the longitudinal slot down onto the wheels 130a-130d. The wheels 130a-130d are therefore able to bear the load. Pairs of wheels 130a-130d may be connected by an axle running through the main body 136 of the trolley 121.

Figure 4:
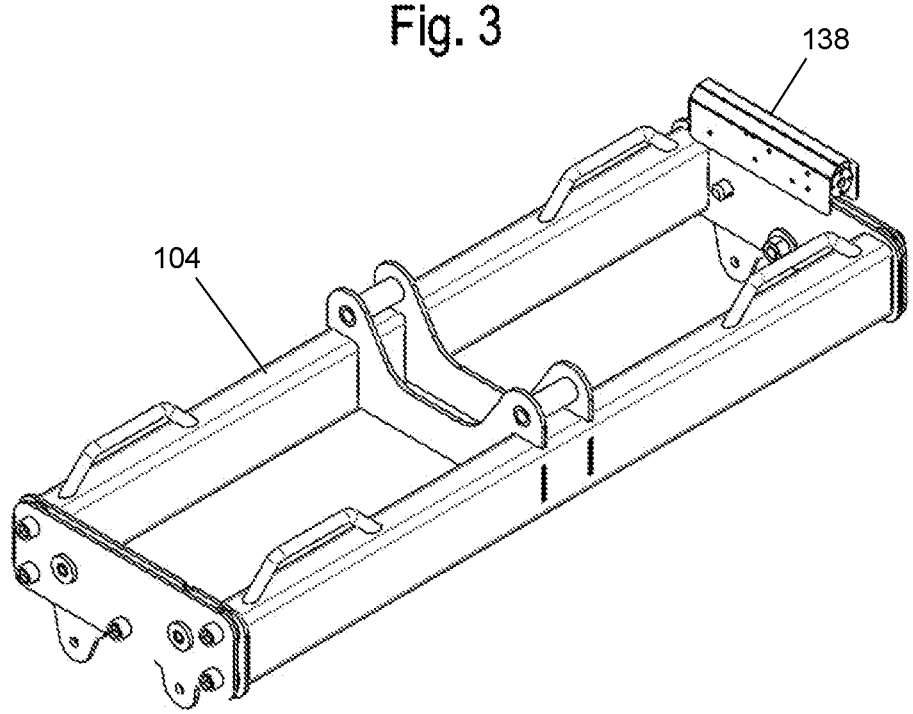
FIG. 4 is an isometric view of a frame for securing to a loudspeaker.

The rigging apparatus further comprises an inclinometer 138 configured to indicate an angle of the beam 102 to the horizontal plane. In an exemplary arrangement, the inclinometer is fixed to the frame 104, as shown in FIG. 4, although the inclinometer 138 could be located on the beam 102. The inclinometer 138 may use, for example, inertial sensors to determine the angle of the beam with respect to the horizontal plane. The inclinometer 138 may provide data to the computer processor and then to a transmitter, which may be a transmitter/receiver formed by the transmitter and the receiver mentioned above. Data indicative of the angle of the beam 102 may be transmitted to the remote control device. It is noted that the remote control device may comprise a plurality of devices, each providing a specific function. For example, a first remote control device may provide display from the inclinometer 138 and a second remote control device may transmit operation instructions to the motor 112.

Figure 5:
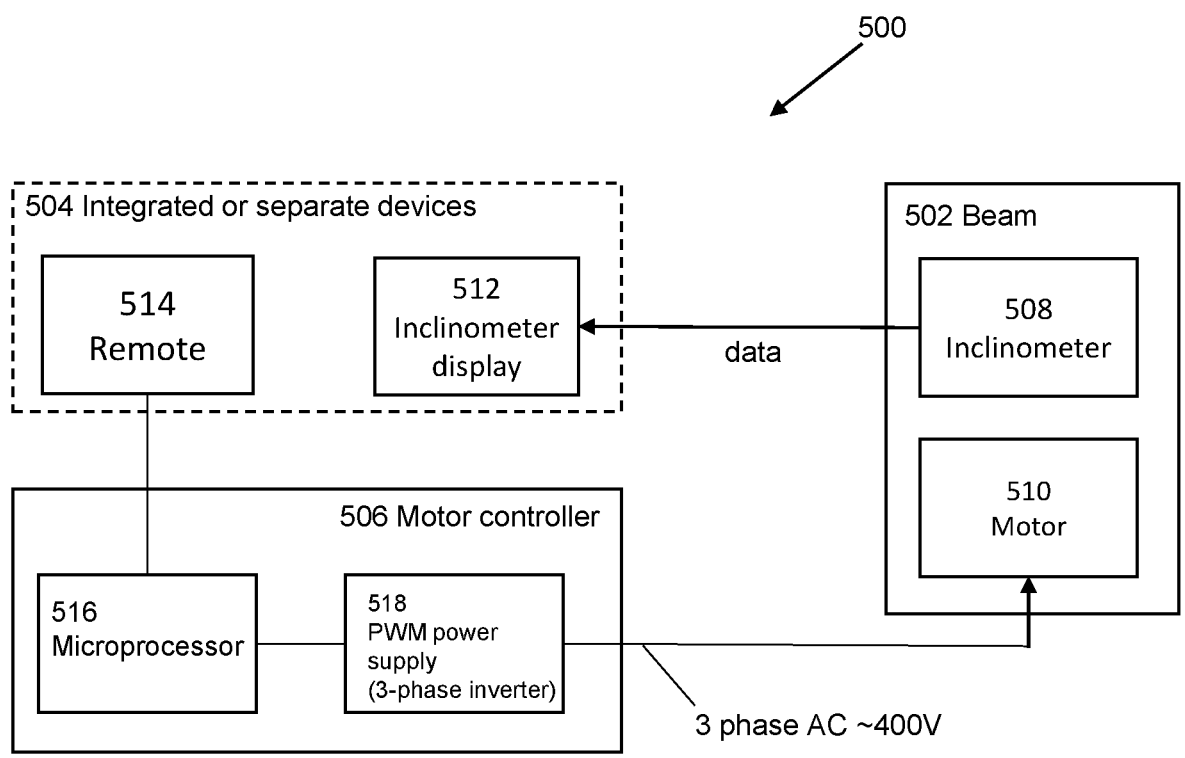
FIG. 5 is a schematic representation of a rigging apparatus.

FIG. 5 shows a schematic representation of at least a part of a rigging apparatus 500, which may be a rigging apparatus 100. The rigging apparatus 500 comprises a beam 502 one or more remote devices 504 and a motor controller 506. The beam 502 includes an inclinometer 508 and an electric motor 510, which may be the inclinometer and electric motor described above. An inclinometer display 512 and a remote control 514 may form the one or more remote devices 504. In exemplary arrangements, the remote control 514 and the inclinometer display 512 may be separate devices or integrated into a single device. The motor controller 506 comprises a microprocessor 516 and a power supply 518. The motor controller may be positioned on the floor or at a location at the top of the array and/or on the beam 502.

The inclinometer 508 is arranged to determine and angular displacement of the beam 502 and transmit data indicative of that angular displacement to the inclinometer display 512. A user is able to monitor the angular displacement via the display 512 and make inputs to the remote 514. The remote 514 transmits data indicative of the inputs to the remote 516 to the microprocessor 516. The microprocessor 516 generates commands to the power supply 518, which outputs power to the motor 510 to control a position of the trolley (not shown).

Figure 6:
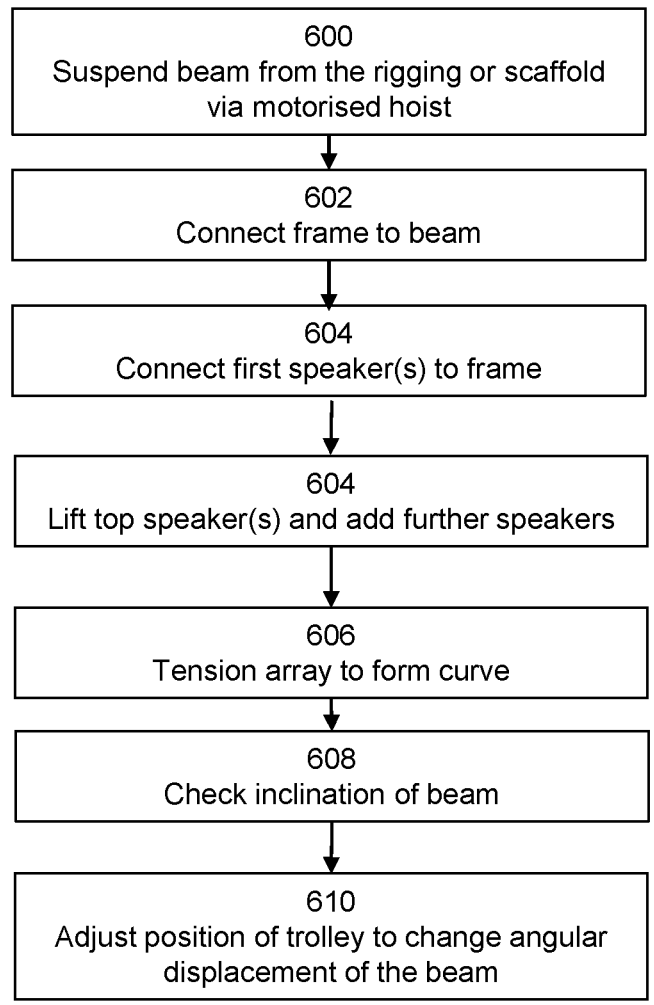
FIG. 6 is a flow diagram of a method for rigging a suspended speaker array.

FIG. 6 shows an exemplary flow chart of a method for rigging a speaker array 106. A top speaker of the array 106 may be connected 600 to the beam 102 and the beam is connected to a lifting frame. As discussed above, in exemplary arrangements this is done via the frame 104, although the speaker may also be directly connected to the beam 102 and/or the beam 102 and the frame 104 may be formed into a single element. In exemplary arrangements, the beam 102 is connected to a lifting frame or apparatus via forward and rearward lifting points 140a, 140b and lifted out of a case. The frame 104 is fixedly connected to the beam 102 such that rotation of the beam 102 results in corresponding rotation of the frame 104. The beam 102 and the frame 104 are then lifted together and a top speaker is connected to the frame 104.

The beam 102, frame 104 and top speaker are lifted 602 by the lifting frame and a further speaker in the array 106 added to the bottom. This process is repeated until the array 106 is formed.

The beam 102 is connected to the rigging by the rigging point 110 such that the beam 102 is angularly displaceable with respect to the horizontal plane. That is, the beam is free to rotate in a vertical plane about the rigging point.

The lever hoist 116 is connected to a lower speaker in the array 106 and the chain 117 is tensioned 606 to form the curve. In other arrangements, the lever hoist 116 may be tensioned remotely using the, or a further, remote control device, which may transmit a signal to the, or a further, motor, which draws in the chain 117 in the direction of arrow 120. As mentioned above, forming the curve changes the centre of gravity of the array 106 and therefore alters the position and direction of the load on the beam 102 relative to the rigging point. This can result in the beam 102 being angularly displaced with respect to the horizontal plane.

The user then checks 608 the angular displacement of the beam 102. In the simplest case, this may be done by eye or by manual means. In exemplary arrangements, the angular displacement of the beam 102 is detected by the inclinometer 138 and transmitted to the remote control device 500. The determined inclination may be displayed on the user interface 502.

The user then adjusts 610 the position of the trolley 121 (and therefore the rigging point 110) along the beam 102. The user inputs instructions to the user interface 502, which are transmitted to the electric motor 112. The electric motor 112 rotates the lead screw 124 to move the trolley 121 along the length of the beam 102.

The user is able to monitor the inclination of the beam 102 on the user interface 502 and adjust the position of the trolley 121 until the beam 102 achieves the required inclination or declination. In some cases this may mean that the beam 102 is made level. In other cases, the beam 102 may be inclined or declined so as to direct the array at a particular point. It will be appreciated that methods and apparatus disclosed herein allow adjustment of angle of beam whilst under load.

The skilled person will be able to envisage further embodiments to those described above, which are intended only as examples, without departing from the scope of the appended claims.

The invention claimed is:

1. A loudspeaker rigging apparatus for suspending a plurality of loudspeakers from temporary or permanent structure, the loudspeaker rigging apparatus comprising:
   a beam configured to be secured to an uppermost speaker in an array of speakers; and
   a trolley coupled to the beam and moveable along at least part of a length of the beam, the trolley comprising a rigging point configured for connection to a rigging or scaffold, wherein the beam may be angularly displaced with respect to a horizontal plane when the rigging point is connected to the rigging or scaffold.

2. The loudspeaker rigging apparatus according to claim 1, further comprising a trolley driver configured to provide a force for moving the trolley along the at least part of the length of the beam.

3. The loudspeaker rigging apparatus according to claim 2, wherein the trolley driver comprises a threaded lead screw, and wherein the trolley comprises a threaded aperture through which the lead screw is received, such that rotation of the lead screw causes linear movement of the trolley.

4. The loudspeaker rigging apparatus according to claim 1, wherein the trolley comprises at least one rotatable element in contact with a surface of the beam and configured to rotate on movement of the trolley.

5. The loudspeaker rigging apparatus according to claim 4, wherein the at least one rotatable element comprises at least one wheel.

6. The loudspeaker rigging apparatus according to claim 4, wherein, in use, the at least one rotatable element of the trolley is configured to contact a downward facing surface of the beam, such that at least a part of the load resulting from suspension of the array of loudspeakers is supported by the at least one rotatable element.

7. The loudspeaker rigging apparatus according to claim 6, wherein an outer wall of the beam forms an internal cavity in which the trolley is received and that permits movement of the trolley along at least part of the length of the beam.

8. The loudspeaker rigging apparatus according to claim 7, wherein an internal upper surface of the internal cavity forms the downward facing surface.

9. The loudspeaker rigging apparatus according to claim 2, further comprising an actuator configured to rotate the lead screw.

10. The loudspeaker rigging apparatus according to claim 9, wherein the actuator comprises an electric motor.

11. The loudspeaker rigging apparatus according to claim 9, further comprising a motor controller for receiving operating instructions for the actuator from a remote device, and controlling the motor based on the received instructions.

12. The loudspeaker rigging apparatus according to claim 1, further comprising an inclinometer, configured to detect the angle of displacement of the beam with respect to the horizontal plane.

13. The loudspeaker rigging apparatus according to claim 12, wherein the inclinometer comprises inertial sensors configured to determine angular displacement.

14. The loudspeaker rigging apparatus according to claim 13, further comprising a display configured to receive and display data indicative of the angle of displacement.

15. The loudspeaker rigging assembly according to claim 1, wherein the trolley is housed, at least partially, within the beam.

16. The loudspeaker rigging assembly according to claim 1, wherein the rigging point protrudes from an upper surface of the beam and is retained within a longitudinal slot formed in an outer wall of the beam.

17. The loudspeaker rigging assembly according to claim 1, wherein the rigging point comprises a single suspension point about which the beam may rotate.

18. A rigged loudspeaker array comprising the loudspeaker rigging assembly of claim 1.

19. A method for suspending a plurality of loudspeakers from a temporary or permanent structure, the method comprising:
   securing an uppermost speaker in an array of speakers to a beam;
   connecting a rigging point of a trolley to the temporary or permanent structure, wherein the trolley is connected to the beam and moveable along at least part of a length of the beam, and wherein the beam may be angularly displaced with respect to a horizontal plane when the rigging point is connected to the temporary or permanent structure;
   tensioning the array of speakers; and
   adjusting a position of the trolley along the length of the beam for achieving a desired angular displacement of the beam.

* * * * *